United States Patent [19]
Berstis et al.

[11] Patent Number: 5,896,132
[45] Date of Patent: Apr. 20, 1999

[54] REPLACEMENT OF TRADITIONAL SCROLL BAR WITH A "MORE" BAR

[75] Inventors: Viktors Berstis, Austin; Donald A. James, Round Rock; Sockalinga Radhakrishnan; James Xavier, both of Austin, all of Tex.

[73] Assignee: International Business Machines Corporation, Armonk, N.Y.

[21] Appl. No.: 08/799,909

[22] Filed: Feb. 10, 1997

[51] Int. Cl.[6] ............................................. G06F 3/14
[52] U.S. Cl. ........................ 345/341; 345/348; 345/354
[58] Field of Search ............................... 345/340, 341, 345/123, 342

[56] References Cited

U.S. PATENT DOCUMENTS

| | | | |
|---|---|---|---|
| 4,514,726 | 4/1985 | Whetstone et al. | 340/710 |
| 4,672,575 | 6/1987 | Stephens | 364/900 |
| 5,122,785 | 6/1992 | Cooper | 340/710 |
| 5,200,738 | 4/1993 | Fumoto et al. | 345/123 |
| 5,333,247 | 7/1994 | Gest et al. | 395/138 |
| 5,337,405 | 8/1994 | Lindauer et al. | 395/147 |
| 5,414,809 | 5/1995 | Hogan et al. | 345/349 |
| 5,495,566 | 2/1996 | Kwatinetz | 345/341 |
| 5,510,808 | 4/1996 | Cina, Jr. et al. | 345/123 |
| 5,568,603 | 10/1996 | Chen et al. | 345/341 |
| 5,581,670 | 12/1996 | Bier et al. | 395/326 |

OTHER PUBLICATIONS

IBM Systems Application Architeture: Common User Access Advanced Interface Design., pp. 59–61, Jun. 1989.
Yahoo Maps, http://maps.yahoo.com/yahoo/, 1994–1998.
Private Label, Vicinity Loop; publication 1 pg. 4, 1996.

*Primary Examiner*—Raymond J. Bayerl
*Assistant Examiner*—Chadwick A. Jackson
*Attorney, Agent, or Firm*—Jeffrey S. LaBaw; Daniel E. Venglarik; Andrew J. Dillon

[57] ABSTRACT

Scroll bars conventionally used in a graphical user interface are replaced with "more" bars at each edge of a display bordering a direction in which more information is available for viewing. Actuation of a cursor on one of the more bars scrolls the display in the direction of the more bar. The more bars provide an intuitive mechanism for controlling the display of graphical user interface.

20 Claims, 9 Drawing Sheets

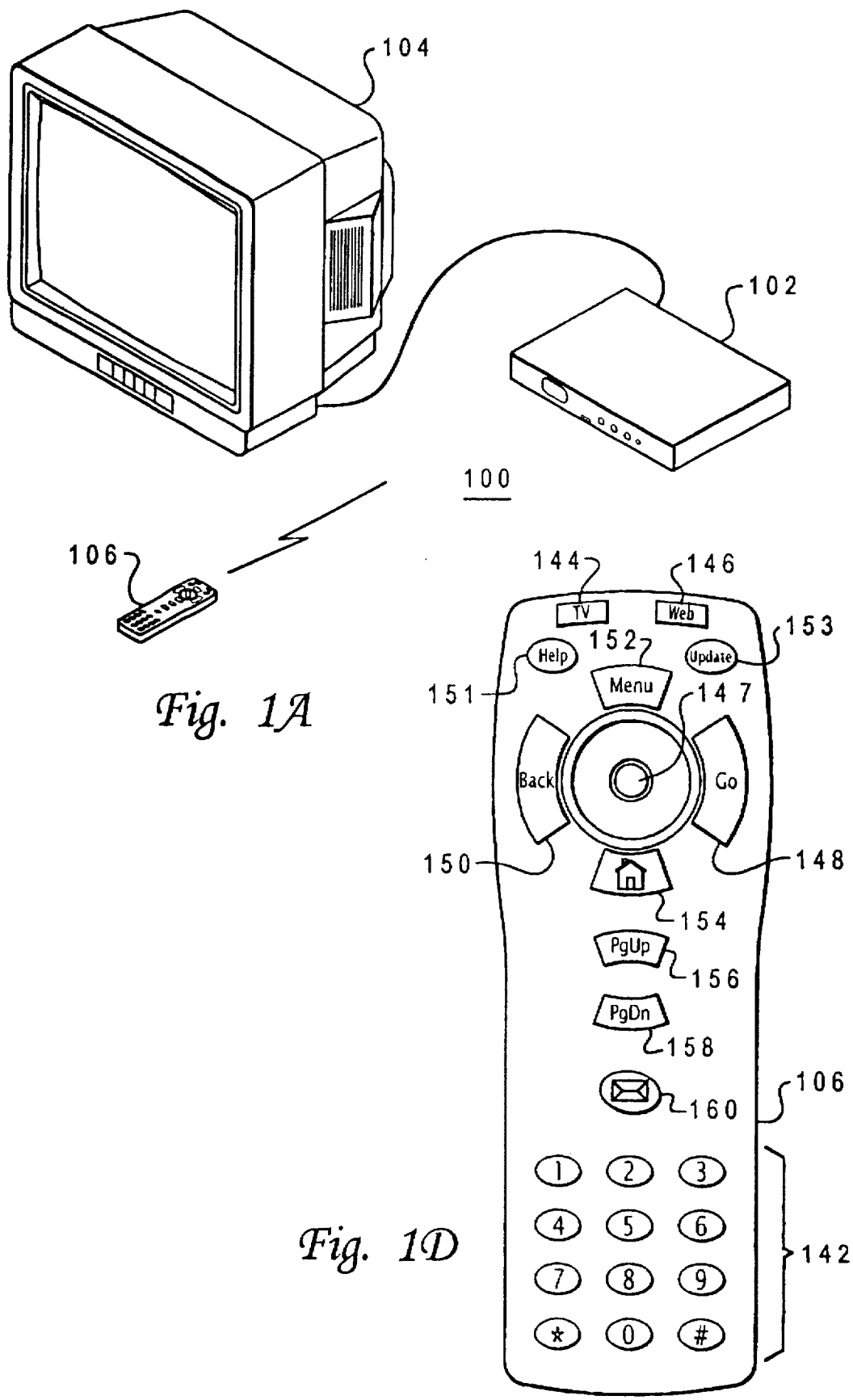

Figure 3A:
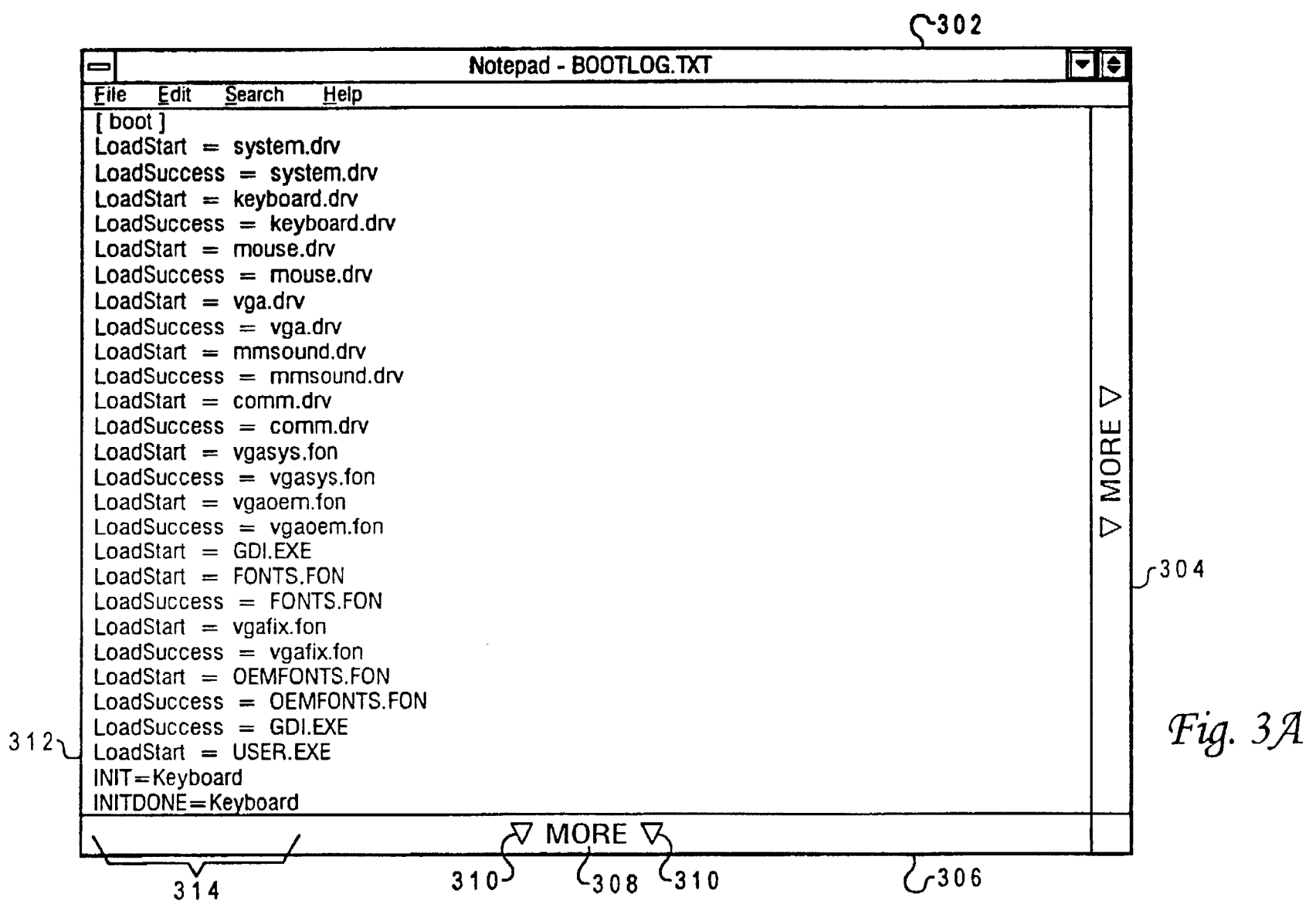

```
Notepad - BOOTLOG.TXT
File  Edit  Search  Help
[boot]
LoadStart    = system.drv
LoadSuccess  = system.drv
LoadStart    = keyboard.drv
LoadSuccess  = keyboard.drv
LoadStart    = mouse.drv
LoadSuccess  = mouse.drv
LoadStart    = vga.drv
LoadSuccess  = vga.drv
LoadStart    = mmsound.drv
LoadSuccess  = mmsound.drv
LoadStart    = comm.drv
LoadSuccess  = comm.drv
LoadStart    = vgasys.fon
LoadSuccess  = vgasys.fon
LoadStart    = vgaoem.fon
LoadSuccess  = vgaoem.fon
LoadStart    = GDI.EXE
LoadSuccess  = FONTS.FON
LoadStart    = vgafix.fon
LoadSuccess  = vgafix.fon
LoadStart    = OEMFONTS.FON
LoadSuccess  = OEMFONTS.FON
LoadSuccess  = GDI.EXE
LoadStart    = USER.EXE
INIT=Keyboard
INITDONE=Keyboard
```

△ MORE △

▽ MORE ▽

REPLACEMENT OF TRADITIONAL SCROLL BAR WITH A "MORE" BAR

BACKGROUND OF THE INVENTION

1. Technical Field

The present invention relates in general to data processing systems and in particular to control mechanisms for graphical user interfaces to data processing systems. Still more particularly, the present invention relates to an intuitive scrolling or window display control mechanism for a graphical user interface.

2. Description of the Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

The largest segment of the consuming public does not currently have access to these resources. Such consumers are typically either unable or unmotivated to acquire both the requisite hardware and software and the necessary computer skills for taking advantage of these resources. There is a need for low cost data processing systems which are simple to operate, allowing users without computer skills the opportunity to access the Internet. This need is being addressed, to some extent, by "WebTV" systems.

In designing a low cost, simple data processing system, however, it is necessary to presume that the target user is unsophisticated and/or inexperienced. Therefore the operation of the data processing system must be both simple and intuitive, requiring little or no technical sophistication on the part of the user. In this regard, it would be advantageous to provide an intuitive mechanism for scrolling or window display control. Some users of these data processing systems will not be aware that more information is available for viewing when the display cannot contain all available information.

Conventionally scroll bars, such as those depicted in FIG. 6, are employed in the graphical user interface of a data processing system. These scroll bars may appear vertically, horizontally, or both. Typically the scroll bars contain arrows at either end for scrolling in the direction of the arrow and a slider for quickly moving the display to a given portion of the total available information.

Computer literate users are familiar with the scroll bar, its significance, and its operation. However, novice or inexperienced users who are utilizing a data processing system simply to access the Internet may have little or no computer knowledge and are unlikely to understand the scroll bar mechanism. Children, in particular, will tend to lack sufficient experience or intuitive capacity to learn to operate the scroll bar mechanism without external assistance.

Unformatted text typically does not require scrolling capacity. However, information available on the Internet consists largely of spatially arranged information, including tables, graphical images, and iconic controls. The spatial arrangement of this information is typically provided using the hypertext markup language (HTML).

It is critical in data processing systems intended for non-computer users or novice users to eliminate the scroll bar and provide the user with a intuitive, meaningful mechanism for controlling the display contents of a graphical user interface in a data processing system. It would be desirable for such a mechanism to both intrinsically inform the user that more information is available for viewing in a particular direction and enable the user to intuitively operate the mechanism.

SUMMARY OF THE INVENTION

It is therefore one object of the present invention to provide an improved data processing system.

It is another object of the present invention to provide an improved control mechanism for a graphical user interface to a data processing systems.

It is yet another object of the present invention to provide an intuitive scrolling or window display control mechanism for a graphical user interface in a data processing system.

The foregoing objects are achieved as is now described. Scroll bars conventionally used in a graphical user interface are replaced with "more" bars at each edge of a display bordering a direction in which more information is available for viewing. Actuation of a cursor on one of the more bars scrolls the display in the direction of the more bar. The more bars provide an intuitive mechanism for controlling the display of graphical user interface.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1A–1D depicts various pictorial representations of a data processing system in which a preferred embodiment of the present invention may be implemented;

FIGS. 3A–3B depict pictorial representations of a graphical user interface incorporating a scroll mechanism in accordance with a preferred embodiment of the present invention;

DETAILED DESCRIPTION OF THE PREFERRED EMBODIMENT

Figure 1B:
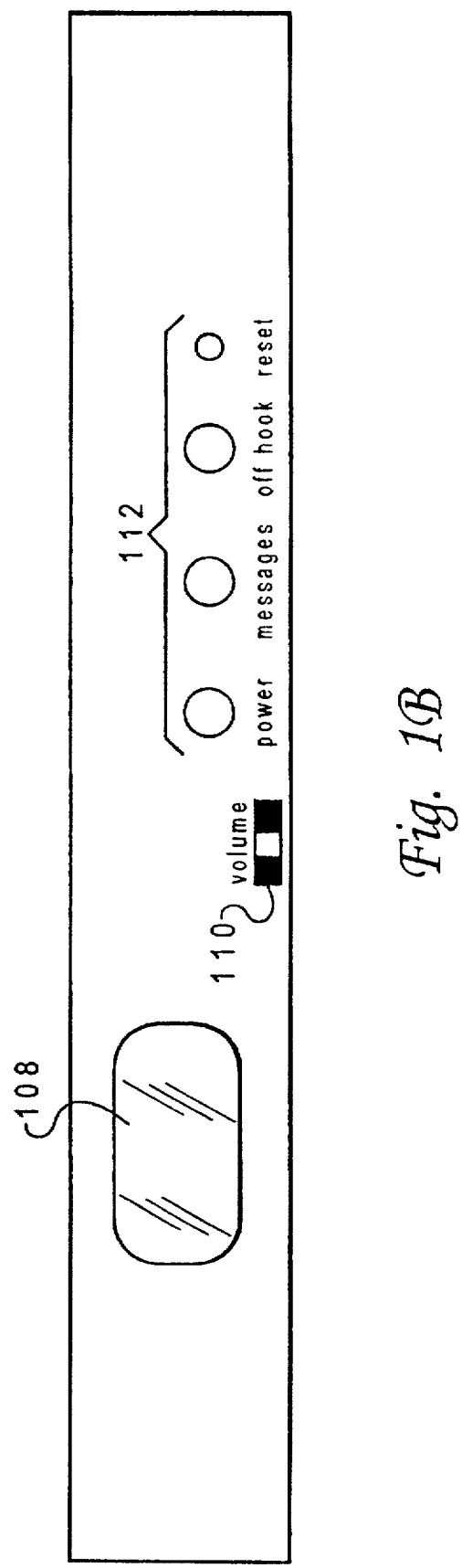

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
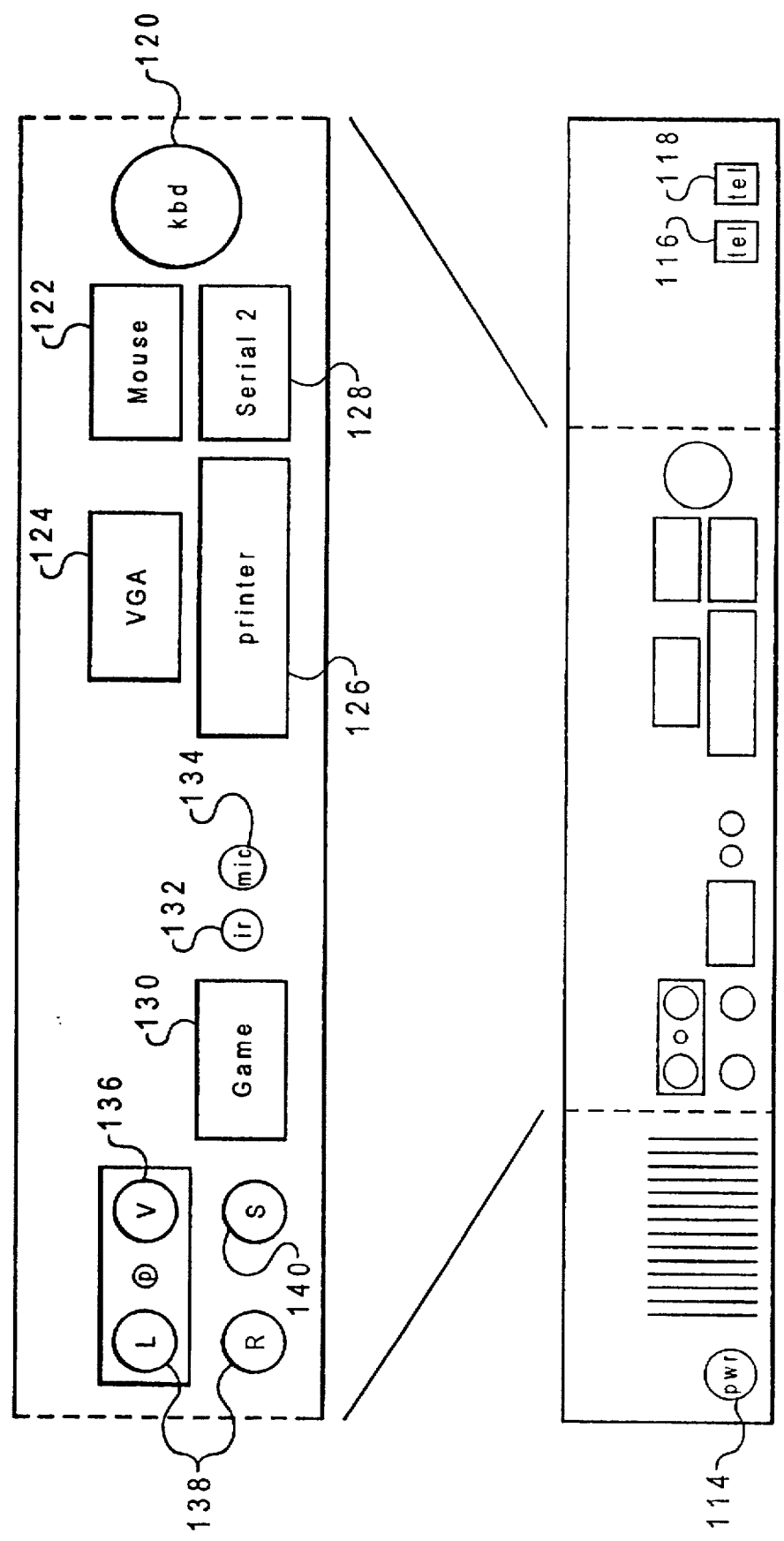

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
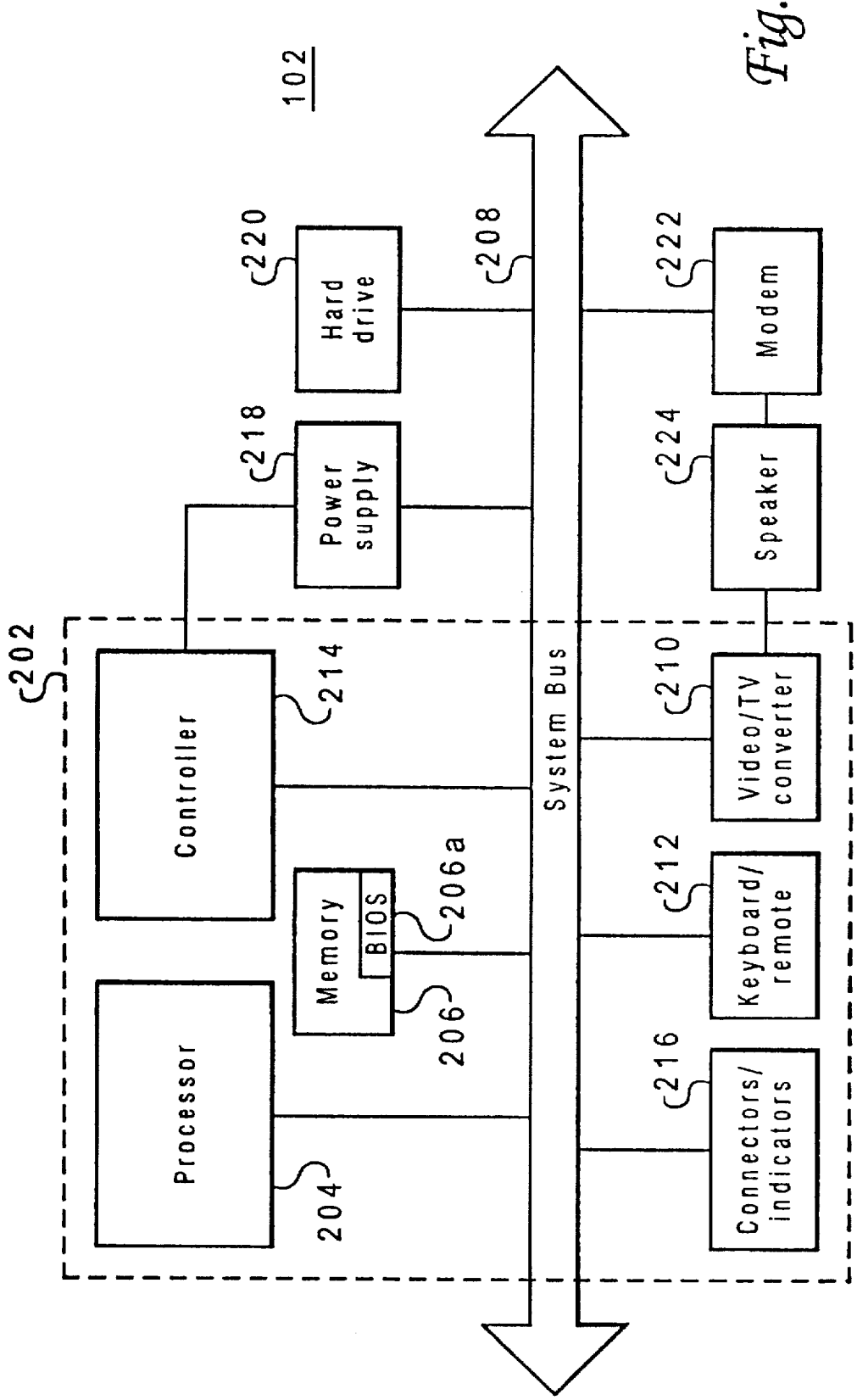
FIG. 2 is a block diagram for the major components of data processing unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1-5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3B:
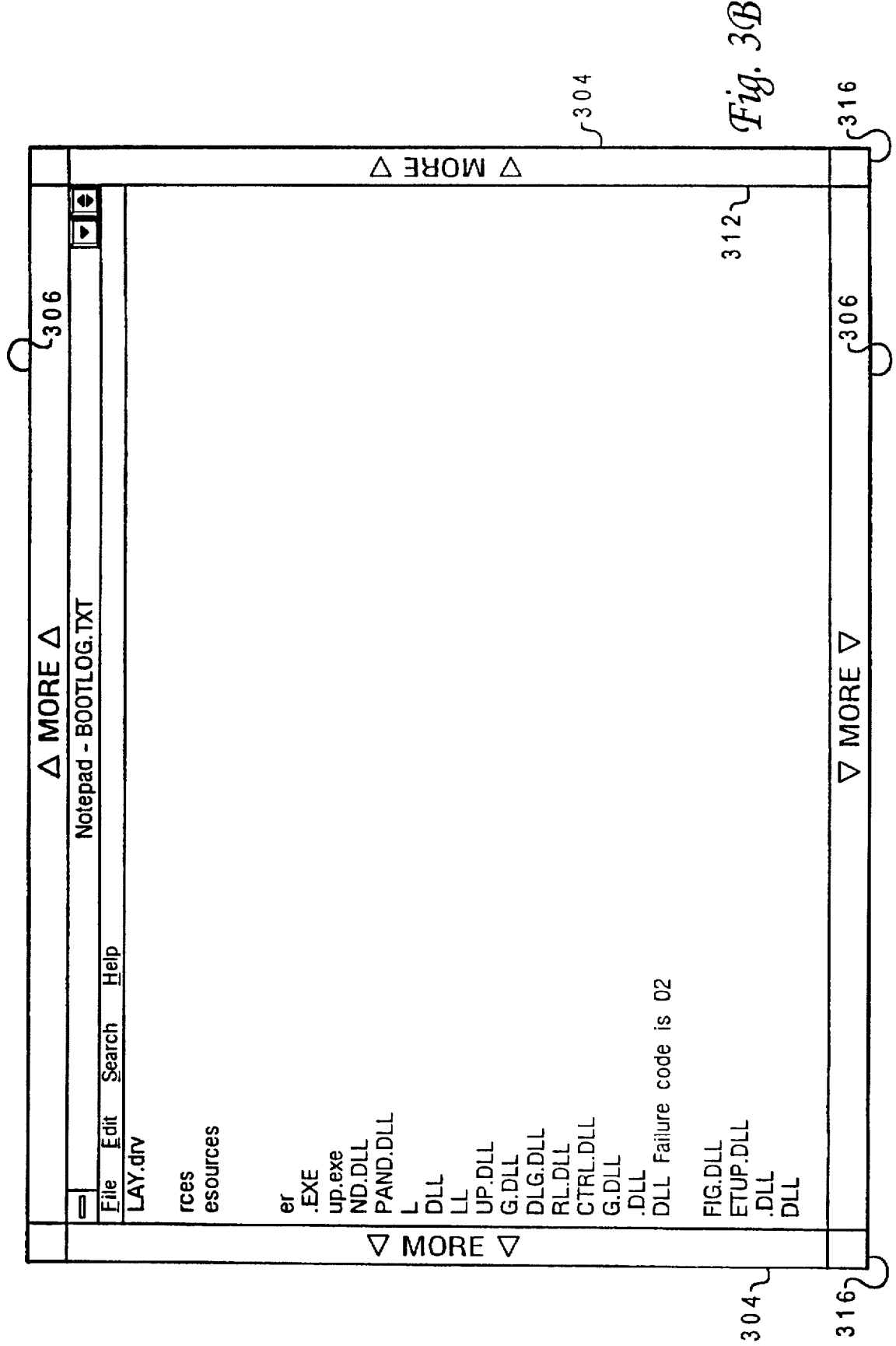

With reference now to FIGS. 3A and 3B, pictorial representations of a graphical user interface incorporating a scroll mechanism in accordance with a preferred embodiment of the present invention are depicted. The mechanisms for generating display of objects on a screen is well known within the art. The graphical user interface 302 for the data processing system displays information in the form of text and graphics. The information display parameters of a display for graphical user interface 302 are determined during system initialization. The traditional scroll bar used to indicate that additional information is available for viewing in at least one direction is replaced with more bars 304 and 306. More bars 304 and 306 appear along an edge of the display, each more bar 304 and 306 on an edge of the display in a direction in which there is more information available for viewing. More bars 304 and 306 extend along substantially the entire length of the edge, except where extending along the length of the edge would cause an overlap of more bars. Although in the preferred embodiment the more bars extend the entire width or height of the display as depicted, shorter more bars, perhaps centered on the edge, may also be utilized. Additionally, more bars may be overlapped, with the intersection of two adjacent more bars being used to scroll the display in two directions, simultaneously. If all available information may be displayed on a screen, no more bars are displayed.

More bars 304 and 306 may be implemented as a bitmap with associated software routines when a pointing device is actuated with the cursor within the space occupied by the more bar. More bars 304 and 306 may contain text, such as the word "MORE" 308 depicted in the preferred embodiment. Text within more bars 304 and 306 may be aligned in any direction, either following the length of the more bar or aligned so that the characters are vertical regardless of the orientation of more bars 304 and 306. In particular, text in vertical more bars 304 may be aligned vertically rather than with the length of the more bar. More bars 304 and 306 may also contain graphical images, such as the arrows 310 depicted in the preferred embodiment.

More bars 304 and 306 may lie within the application space 312 of a graphical user interface as depicted in FIG. 3A. In such embodiments, portions 314 of the more bar may be made "transparent," displaying the image underlying more bars 304 and 306. Alternatively, as depicted in FIG. 3B, more bars 304 and 306 may lie outside the application space 312. Corner fillers 316 may be necessary to complete the graphical display in such embodiments. Information passed to a data processing system for the creation of scroll bars which would normally be displayed by a browser may be intercepted and employed to generate more bars in accordance with the present invention.

Figure 4:
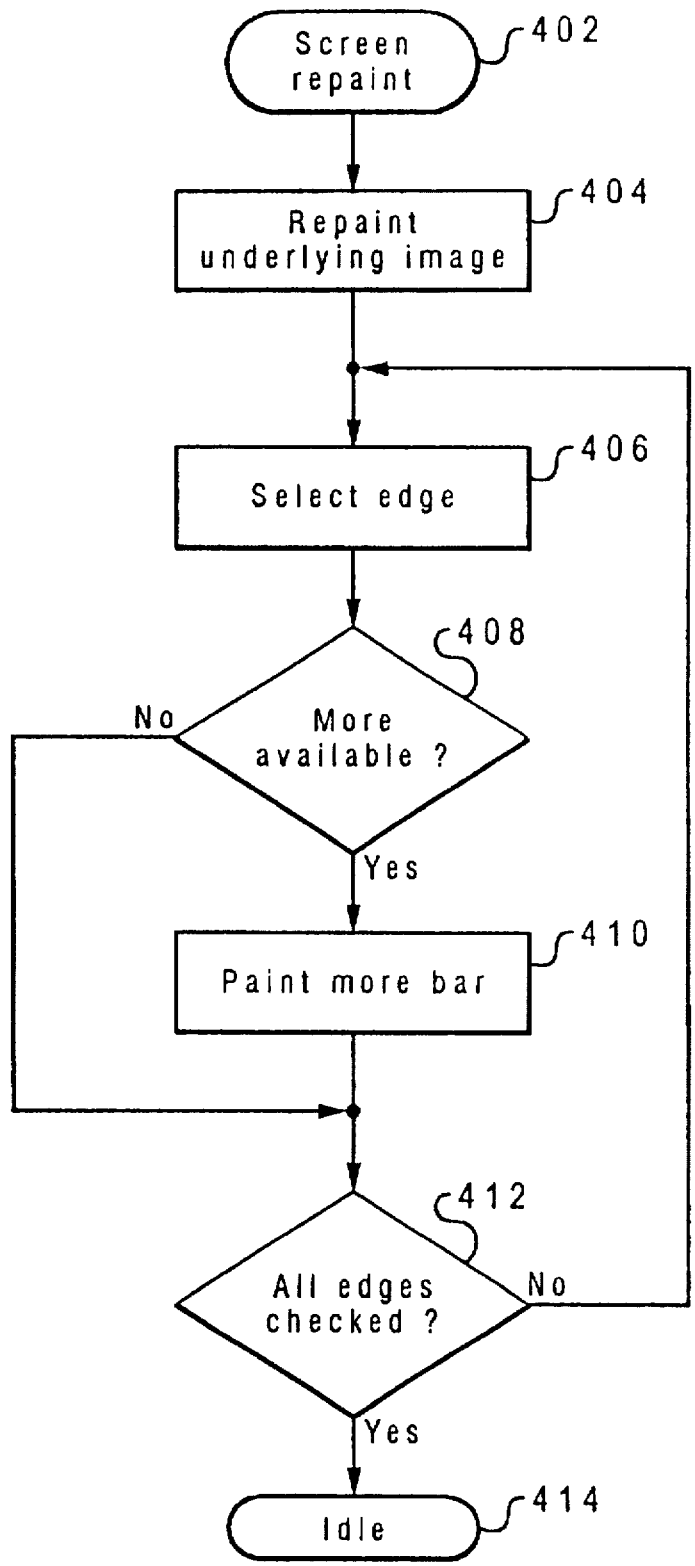
FIG. 4 is a high level flowchart for a process for providing more bars in accordance with a preferred embodiment of the present invention.

Referring to FIG. 4, a high level flowchart for a process for providing more bars in accordance with a preferred embodiment of the present invention is portrayed. The process begins at step 402, which depicts a screen repaint command being received. The process then passes to step 404, which illustrates repainting the underlying image, and then to step 406, which depicts selecting an edge of the display. The process passes next to step 408, which illustrates a determination of whether more information is available for viewing in the direction of the edge selected than is presently displayed in the viewable area. If so, the process proceeds to step 410, which depicts drawing or painting a more bar on the currently selected edge of the display, and then to step 412. If not, however, the process proceeds instead directly to step 412.

Step 412 illustrates a determination of whether all edges of the display have been checked. If not, the process returns to step 406 for selection of a new edge to be checked. If so, however, the process passes instead to step 414, which depicts the process becoming idle until the screen must again be repainted or redrawn.

Figure 5:
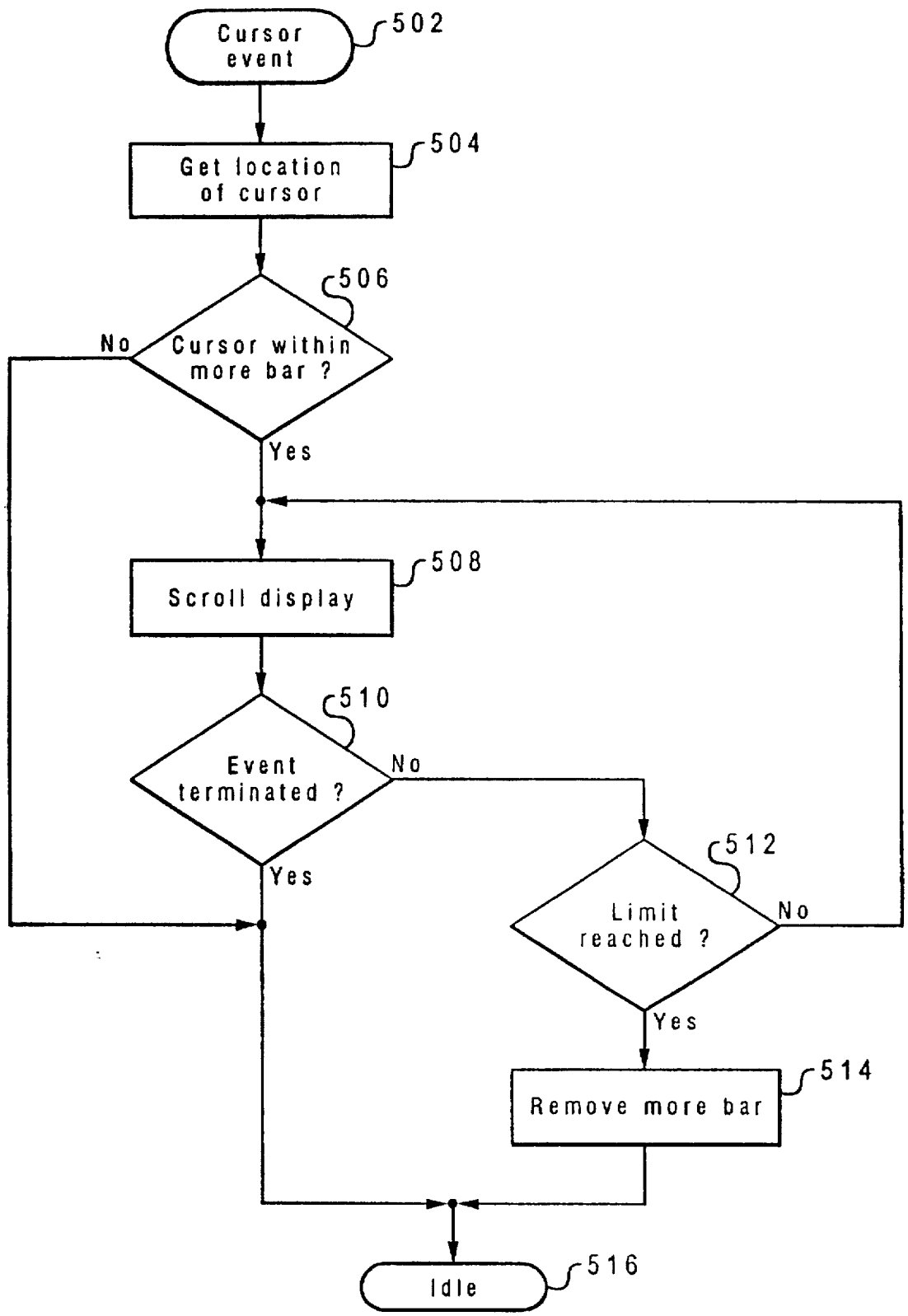
FIG. 5 depicts a high level flowchart for a process for employing more bars in accordance with a preferred embodiment of the present invention.
Figure 6:
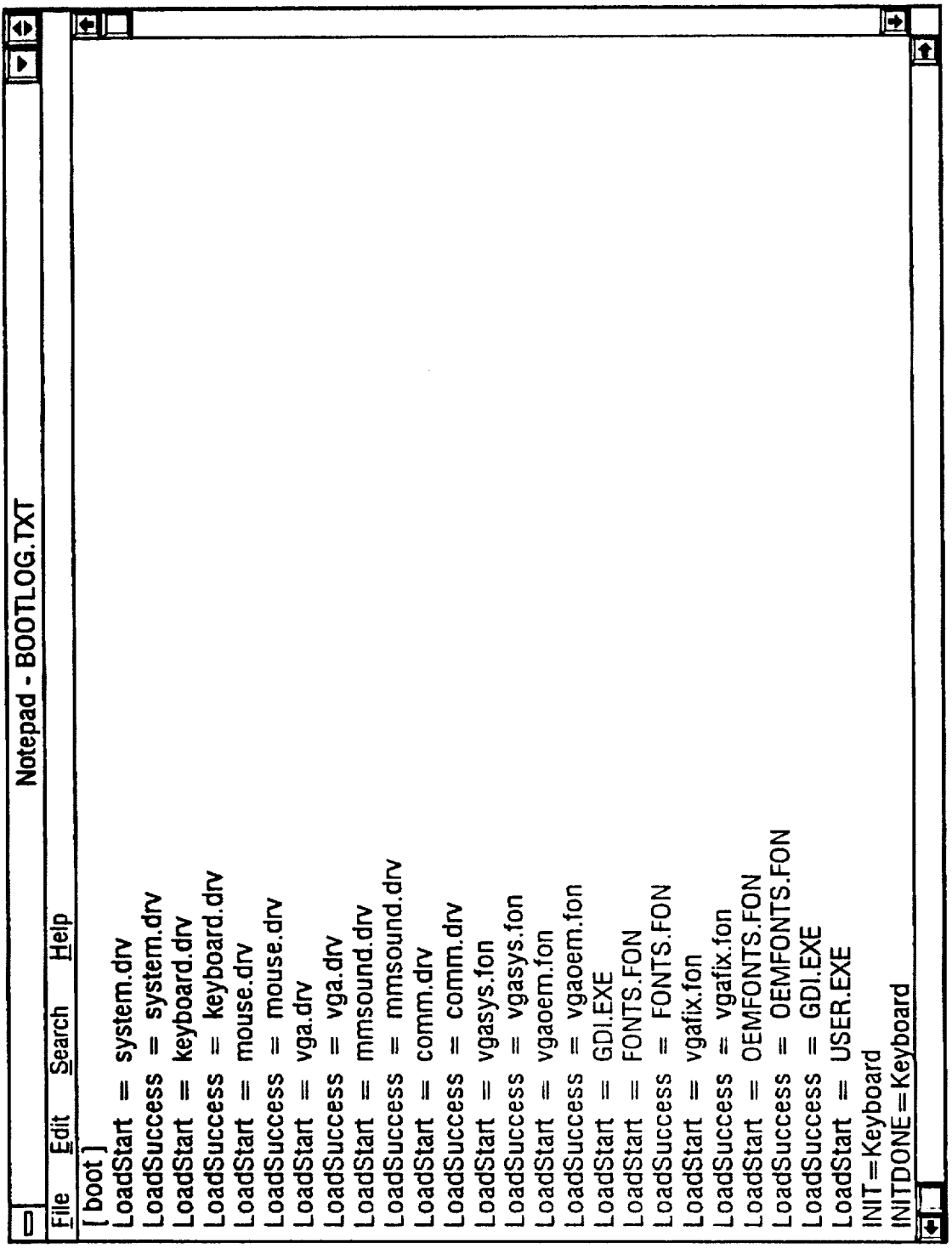
FIG. 6 is a pictorial representation employing scroll bars in accordance with the prior art.

With reference now to FIG. 5, a high level flowchart for a process for employing more bars in accordance with a preferred embodiment of the present invention is portrayed. The process begins at step 502, which depicts the occurrence of a cursor event such as actuation of a pointing device (mouse button or "Go" button). The process then passes to step 504, which illustrates determination of the display location of the cursor, and to step 506, which depicts a determination of whether the cursor is located within the display space occupied by a more bar. If not, the process passes directly to step 516, which illustrates the process becoming idle until the next cursor event. If the cursor is situated within the space occupied by a more bar, however, the process proceeds to step 508, which illustrates scrolling the display in the direction of the display edge containing that more bar. As used herein, scrolling the display in the direction of an edge means moving the display window such that the center of the display window is moved in the direction of the edge, beyond which additional information is available for viewing. The displayed items are actually moved in the opposite direction, to make room for the additional information. However, a direction of scrolling is determined by the direction in which the display window is moved within the body of available information to be displayed.

The process then passes to step 510, which depicts a determination of whether the cursor event has terminated. If not, the process proceeds to step 512, which illustrates a determination of whether the limit of available information has been reached in the direction in which the display is being scrolled. If not, the process returns to step 508 and the display will continue to be scrolled. If so, however, the process proceeds instead to step 514, which depicts removing the more bar from the display, and then to step 516, which illustrates the process becoming idle until the next cursor event. The process of steps 508-512 will be repeated, and the display continuously scrolled in the direction of the edge containing the more bar, until either the cursor event terminates (the "Go" button is released) or the limit of available information in that direction has been reached.

The cursor event which initiates scrolling of the display may be movement of the cursor into the display space occupied by the more bar. In such an embodiment, scrolling of the display may include a proportional move of the cursor, so that continued scrolling is achieved by continued movement of the cursor into the display space occupied by the more bar.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The present invention provides a meaningful alternative to scroll bars in the graphical user interface of a data processing system, an simple display control mechanism which novices and children will intuitively understand. The display may still be scrolled up, down, left or right depending on the size of the information being displayed. The presence of a more bar only on the edges of the display which border directions in which more information is available for viewing informs the user of which directions contain more information for viewing and provides an instinctive mechanism for scrolling the display in that direction. In general, any data processing system in which a simpler, more intuitive mechanism for scrolling a graphical user interface display would be useful may benefit from the present invention.

While the invention has been particularly shown and described with reference to a preferred embodiment, it will be understood by those skilled in the art that various changes in form and detail may be made therein without departing from the spirit and scope of the invention.

What is claimed is:

1. A method of providing a display control mechanism in a data processing system, comprising:

displaying information in a display area on a display in said data processing system wherein said display area has a fixed size;

identifying all edges of said display area which define a perimeter of said display area in a direction in which said display area may be scrolled to view additional information on said display; and displaying an indicator only at each edge of said display area in a direction in which said display area may be scrolled to view additional information, said indicator indicating said direction and representing a control mechanism for scrolling said display area in said direction, wherein an intuitive scrolling indicator is provided for a graphical user interface to said data processing system.

2. The method of claim 1, wherein said step of displaying an indicator at each edge further comprises displaying a graphical image at at least one edge of said display area representative of said control mechanism for scrolling said display area in said direction.

3. The method of claim 1 wherein:

said step of identifying all edges of said display area which define a perimeter of said display area in a direction in which said display area may be scrolled to view additional information on said display further comprises determining each direction in which said display area may be scrolled to view additional information; and said step of displaying an indicator at each edge in a direction in which said display area may be scrolled to view additional information further comprises displaying a plurality of indicators, one indicator within said plurality of indicators at each edge of said display area in a direction in which said display area may be scrolled to view additional information.

4. The method of claim 1, further comprising:

responsive to a user actuating an input device controlling said cursor, determining a location of said cursor within said display area;

determining whether said cursor is positioned within a portion of said display area occupied by an indicator; and responsive to determining that said cursor is positioned within a portion of said display area occupied by an indicator, scrolling said display area in a corresponding direction.

5. The method of claim 4, further comprising:

subsequent to said step of scrolling said display area in said corresponding direction, determining whether additional information may be viewed by additional scrolling of said display area in said corresponding direction; and responsive to determining that no additional information may be viewed by additional scrolling of said display area in said corresponding direction, removing said indicator occupying said portion of said display area from said display.

6. An apparatus for providing a display control mechanism in a data processing system, comprising;

first display means for displaying information in a display area on a display in said data processing system wherein said display area has a fixed size;

determination means for identifying all edges of said display area which define a perimeter of said display area in a direction in which said display area may be scrolled to view additional information on said display; and second display means for displaying an indicator only at each edge of said display area in a direction in which said display area may be scrolled to view additional information, said indicator indicating said direction and representing a control mechanism for scrolling said display area in said direction, wherein an intuitive scrolling indicator is provided for a graphical user interface to said data processing system.

7. The apparatus of claim 6, wherein said second display means further comprises means for displaying a graphical image at at least one edge of said display area representative of said control mechanism for scrolling said display area in said direction.

8. The apparatus of claim 6 wherein:

said determination means further comprises means for determining each direction in which said display area may be scrolled to view additional information; and said second display means further comprises means for displaying a plurality of indicators, one indicator within said plurality of indicators at each edge of said display area in a direction in which said display area may be scrolled to view additional information.

9. The apparatus of claim 6, further comprising:

second determination means, responsive to a user actuating an input device controlling said cursor, for determining a location of said cursor within said display area;

third determination means for determining whether said cursor is positioned within a portion of said display area occupied by an indicator; and scrolling means, responsive to determining that said cursor is positioned within a portion of said display area occupied by an indicator, scrolling said display area in a corresponding direction.

10. The apparatus of claim 9, further comprising:

fourth determination means for determining, after scrolling said display area in said corresponding direction, whether additional information may be viewed by additional scrolling of said display area in said corresponding direction; and fourth display means, responsive to determining that no additional information may be viewed by additional scrolling of said display area in said corresponding direction, for removing said indicator occupying said portion of said display area from said display.

11. A method of employing a more bar in a data processing system, comprising:

for each direction in which a display area displaying information contained in a memory in said data processing system and having a fixed size may be scrolled to view additional information in said display area, displaying an indicator at an edge of said display area in said direction, said indicator representative of a mechanism for scrolling said display area in said direction;

for each direction in which said display area may not be scrolled to view additional information, not displaying an indicator at an edge of said display area in said direction and displaying information in a portion of said display area which would otherwise be occupied by said suppressed indicator; and responsive to a user actuating an input device while said cursor is positioned within a space in said display area occupied by a displayed indicator, scrolling said display area in a corresponding direction.

12. The method of claim 11, further comprising:

responsive to a determination, after scrolling said display area in said corresponding direction, that no additional information may be viewed in said display area by additional scrolling of said display area in said corresponding direction, suppressing said displayed indicator and displaying information in a portion of said display area which would otherwise be occupied by said previously displayed indicator.

13. The method of claim 11, wherein said step of displaying an indicator further comprises displaying a plurality of indicators, one indicator within said plurality of indicators at each edge of said display area in a direction in which said display area may be scrolled to view additional information.

14. A graphical user interface for a data processing system, comprising:

a display area having a fixed size and displaying a portion of information contained within a memory in said data processing system;

an indicator displayed in said display area at each edge of said display area bounding said display area in a direction in which said display area may be scrolled to view additional information contained within said memory, said indicator representative of a mechanism for scrolling said display area in said direction, wherein said display area contains an intuitive scrolling indicator; and no indicators at each edge of said display area bounding said display area in a direction in which said display area may not be scrolled to view additional information contained within said memory.

15. The graphical user interface of claim 14, further comprising:

a plurality of indicators displayed in said display area, one indicator within said plurality of indicators at each edge of said display area bounding said display area in a direction in which said display area may be scrolled to view additional information contained within said memory.

16. The graphical user interface of claim 14, wherein said indicator extends an entire length of said edge.

17. A computer program product for use with a data processing system, comprising:

a computer usable medium;

first instructions on said computer usable medium for each direction in which a display area displaying information contained in a memory in said data processing system and having a fixed size may be scrolled to view additional information in said display area, for displaying an indicator at an edge of said display area in said direction, said indicator representative of a mechanism for scrolling said display area in said direction;

second instructions on said computer usable medium for suppressing display of an indicator at an edge of said display area in a direction in which said display area may not be scrolled to display additional information;

third instructions on said computer usable medium, responsive to a user actuating an input device while said cursor is positioned within a space in said display area occupied by a displayed indicator, for scrolling said display area in a corresponding direction; and fourth instructions on said computer usable medium, responsive to a determination, after scrolling said display area in said corresponding direction, that no additional information may be viewed in said display area by additional scrolling of said display area in said corresponding direction, for not displaying said indicator.

18. The computer program product of claim 17, wherein the computer computer usable medium is a hard disk drive.

19. The computer program product of claim 17, wherein the computer computer usable medium is a floppy disk.

20. The computer program product of claim 17, wherein the computer computer usable medium is a CD-ROM.

* * * * *